United States Patent [19]

Apple et al.

[11] 4,315,249

[45] Feb. 9, 1982

[54] DATA COMMUNICATION SYSTEM FOR ACTIVATING REMOTE LOADS

[75] Inventors: William C. Apple, Brighton; Keith D. Jacob, Ann Arbor, both of Mich.

[73] Assignee: Multi-Elmac Company, Novi, Mich.

[21] Appl. No.: 140,044

[22] Filed: Apr. 14, 1980

Related U.S. Application Data

[63] Continuation-in-part of Ser. No. 15,495, Feb. 26, 1979.

[51] Int. Cl.[3] .............................................. H04Q 9/00

[52] U.S. Cl. .......................... 340/825.52; 340/825.63; 340/825.65

[58] Field of Search ........... 340/147 R, 167 R, 168 R, 340/168 S, 168 B

[56] References Cited

U.S. PATENT DOCUMENTS

| | | | |
|---|---|---|---|
| Re. 29,525 | 1/1978 | Willmott | 340/168 R |
| 4,037,201 | 7/1977 | Willmott | 340/167 R |
| 4,091,361 | 5/1978 | Eichelberger | 340/168 S |
| 4,141,010 | 2/1979 | Umpleby | 340/147 R |

*Primary Examiner*—Harold I. Pitts
*Attorney, Agent, or Firm*—Krass, Young & Schivley

[57] ABSTRACT

A data communication system for selectively activating a plurality of remote loads. The system includes a transmitter having an encoder with first and second sets of inputs. The encoder provides a multi-bit pulse train for transmission to a receiver. Selected bits of the pulse train are associated with the first set of inputs to the encoder and define an address code. Other bits of the transmitted pulse train are associated with the second set of encoder inputs and define data. A receiver incorporates a decoder coupled for receipt of the pulse train from the transmitter. A set of code select inputs for the decoder defines a local address code for the receiver. A pulse generator provides a local pulse train which is a function of the code select inputs. A comparator normally operates to compare all of the bits in the local pulse train with those in the received pulse train from the transmitter, with the comparator output preventing load actuation unless all of the bits match. However, logic circuitry is provided for selectively preventing the comparator from comparing the bits in the received pulse train defining data with corresponding bit positions in the local pulse train. Selected loads are then activated according to the states of the data bits in the received pulse train if the address code portions of the local and received pulse trains match.

12 Claims, 11 Drawing Figures

DIGITAL ENCODER
DATA LINK
DIGITAL DECODER
ACTIVATED DEVICE

ENCODER
CODE SELECT
TRANSMITTER
RECEIVER
DECODER
ACTIVATED DEVICE
R1
C1
R2
R3
C2
C3
N C
[-V]
[+V]
P1
P2
P3
P4
P5
P6
P7
P8
P9
P10
P11
P12
P13
P14
P15
P16
P17
P18

VDD
OSC
ERROR
TRANS. OUT
REC IN
REC OUT
TEST
VSS
S10
S1
S2
S3
S4
S5
S6
S7
S8
S9

1-10 CODE SWITCHES
OPEN CKT. OR $V_{ss}$

DATA COMMUNICATION SYSTEM FOR ACTIVATING REMOTE LOADS

CROSS REFERENCE TO RELATED APPLICATIONS

This application is a continuation-in-part of U.S. Ser. No. 015,495 entitled "Combination Encoder-Decoder Integrated Circuit Device", filed Feb. 26, 1979, and assigned to the assignee of the present invention.

BACKGROUND OF THE INVENTION

This invention relates to data communication systems. More particularly, it involves a data communication system empolying an encoder and a decoder for remotely activating selected loads.

In the above-identified parent application, there is disclosed an improved combination encoder/decoder device which may be used to activate a remote load such as a garage door. The encoder is used in a transmitter to generate a digital pulse train which is transmitted to the receiver. The transmitted pulse train is a function of the setting of a plurality of two position switches. The receiver generates a local pulse train which is defined by its own set of two position switches. The decoder includes a comparator which compares the received code from the transmitter with the locally generated code on a pulse by pulse basis. If there is a match between the received code and the local code, a signal is provided for actuating the load. While the device disclosed in this application has provided extremely satisfactory results, its disclosure was primarily directed towards the activation of a single load.

SUMMARY OF THE INVENTION

The present invention is directed towards the task of expanding the capabilities of the combination encoder/decoder device disclosed in the identified parent application. In particular, it is the primary object of this invention to provide a data communication system utilizing the combination encoder/decoder device disclosed in the parent application that will be capable of remotely activating a plurality of different loads.

Briefly, these and other objects of this invention are accomplished by using two sets of inputs to the encoder in the transmitter. Selected bits of the transmitted pulse train are associated with the first set of encoder inputs and will define an address code. The other bits in the pulse train are associated with the second set of encoder inputs and define data. Preferably, each of the second set of inputs provides information for controlling the activation of a particular load. The receiver includes a set of code select inputs for defining a local address code. The decoder in the receiver includes a generator for providing a local pulse train having selected bits which are a function of the code select inputs. A comparator has inputs coupled for receipt of the local pulse train and the received pulse train from the transmitter. Means are provided for selectively disabling the comparator from comparing the bits in the received pulse train defining the data with corresponding bit positions in the local pulse train. The various loads are selectively activated according to the states of the data bits in the received pulse train if the address code portions of the local and received pulse trains match.

BRIEF DESCRIPTION OF THE DRAWINGS

These and other advantages of the present invention will become more apparent upon reading the following specification and by reference to the drawings in which.

DETAILED DESCRIPTION OF THE PREFERRED EMBODIMENT

Figures 1, 2, 3:
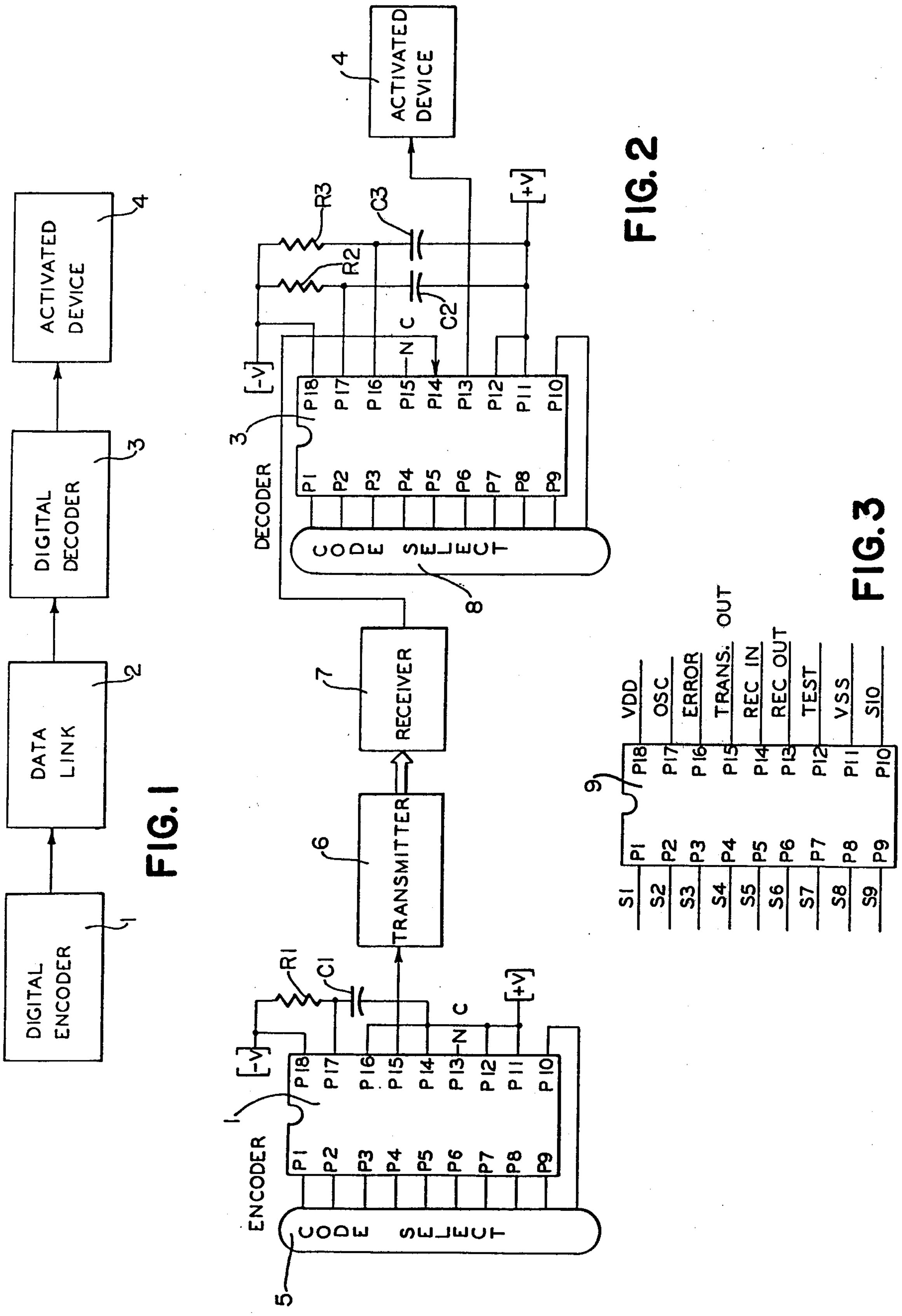
FIG. 1 is a block diagram showing the major components of a system in which the present invention finds particular utility.
FIG. 2 is a block diagram showing in more detail the interconnections of the device of the present invention with the components of the system of FIG. 1.
FIG. 3 is a view illustrating one embodiment of the package of the present device with its input and output ports labeled.

It should be noted from the outset that the present invention, while finding particular utility in a remotely actuated garage door opener environment is ideally suited for any type of communication system in which limited access is desired such as the communication system shown in FIG. 1 which includes a digital encoder 1 for providing signals having a preselected code which are transmitted through a data link 2 to a digital decoder 3, with decoder 3 determining whether the correct signal has been received and, if so, actuating a load or device 4.

Referring to FIGS. 2 and 3, there is shown an example of the implementation of the present invention into a system described in connection with FIG. 1. It should be noted that throughout this description, the same reference numerals will be used to refer to the same components throughout the Figures in order to aid the reader in more fully understanding the operation of the invention.

Pursuant to the present invention, the encoder 1 and decoder 3 utilize exactly the same device and differ only in that the external connections thereto are slightly different. The device of the present invention is preferably packaged in a dual-in-line (DIP) package 9. As shown in FIGS. 2 and 3, package 9 includes a plurality of input/output ports P1–P18. When utilized in the encoder mode, ports P1–P10 are connected to a code select means 5 which, in this example, is a plurality of two position switches or voltages which set the digital code for encoder 1. Ports P11 and P12, P14 and P16 are connected to a suitable positive biasing voltage, while P18 is connected to a suitable negative voltage or ground. Pin P17 is coupled to an external resistor R1 and capacitor C1 to determine a proper oscillating frequency. P15 is the encoder or transmitter output which is fed to transmitter 6 which can be of any variety of types. The most common transmission scheme for garage door openers is a modulated RF signal activated by the digital output signal. However, many other types of transmission devices can be utilized such as infrared systems with modulated light to a pair of wires to send the digital data.

A receiver 7 compatible with the transmitter 6 serves to recover the digital information transmitted and feeds it to the decoder input. The device utilized in decoder 3 is exactly the same as that of encoder 1 except that the external connections to it have been slightly changed. Pin 14 receives the incoming signal from receiver 7. Pins P1–P10 are connected to similar code select switches 8. Code select switches 8, if set to the same code as code select 5, will cause decoder 3 to initiate a signal over pin P13 to activate device 4. Pins P11 and P12 are connected to suitable positive biasing voltages, while pin P18 is connected to a proper negative voltage or ground. Pin P17 is coupled to an internal resistor R2 and capacitor C2 to provide an RC time constant to set a similar frequency to the encoder frequency. Pin P16 is coupled to an external resistor R3 and capacitor C3 which sets the resolution or allowable error between the received signal and the local digital signal developed in the decoder itself as will be fully described later herein. The activated device for the load may be a variety of types including a transistor, relay or other type of switching device which may be coupled to a motor, for example, to activate a garage door opener.

From the foregoing description, it can now be realized that the same device can be utilized as both the encoder 1 and decoder 3 merely by making slight changes to the external connections to the device. Although 18 input/output ports P1–P18 are provided, only changes to four pins, P13–P17, need be made to change the function of the device. This is because the present invention utilizes common functional circuit components in both modes of operation. The following description will describe in more detail the functional portions of the dual purpose device of the present invention in connection with the electronic circuitry. It is important to realize, however, that this circuitry is contained in a semiconductor integrated circuit device 9 which is packaged along the lines shown in FIG. 3. Due to the state of semiconductor technology, it is not necessary to go into any detail regarding the method of manufacture of such a chip since it is well within the skill of an ordinary practitioner to make such a device given the circuitry and layout as will now be described.

Figure 4A:
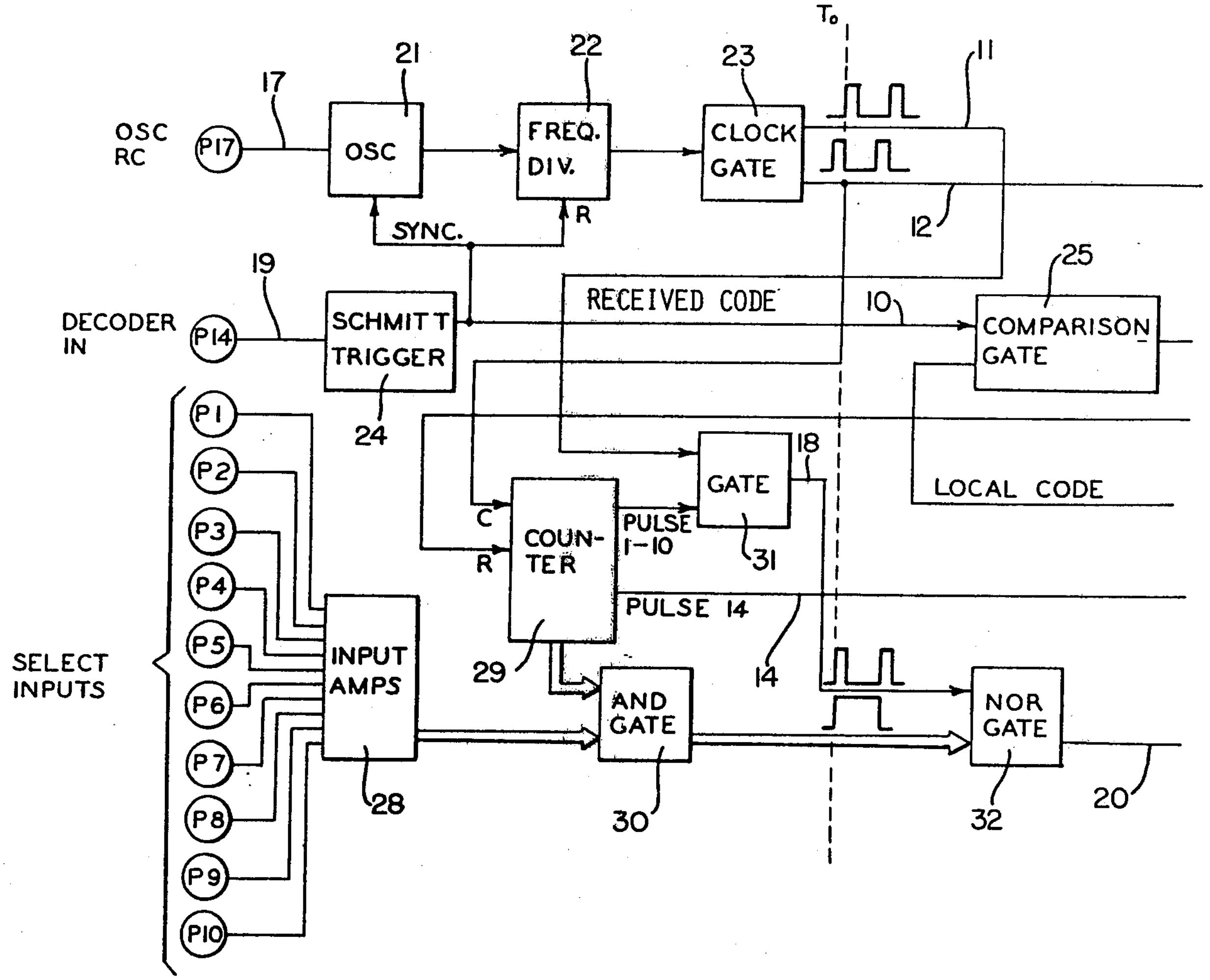
FIGS. 4A and 4B are a block diagram illustrating the major components of the circuitry of the present invention.
Figure 4B:
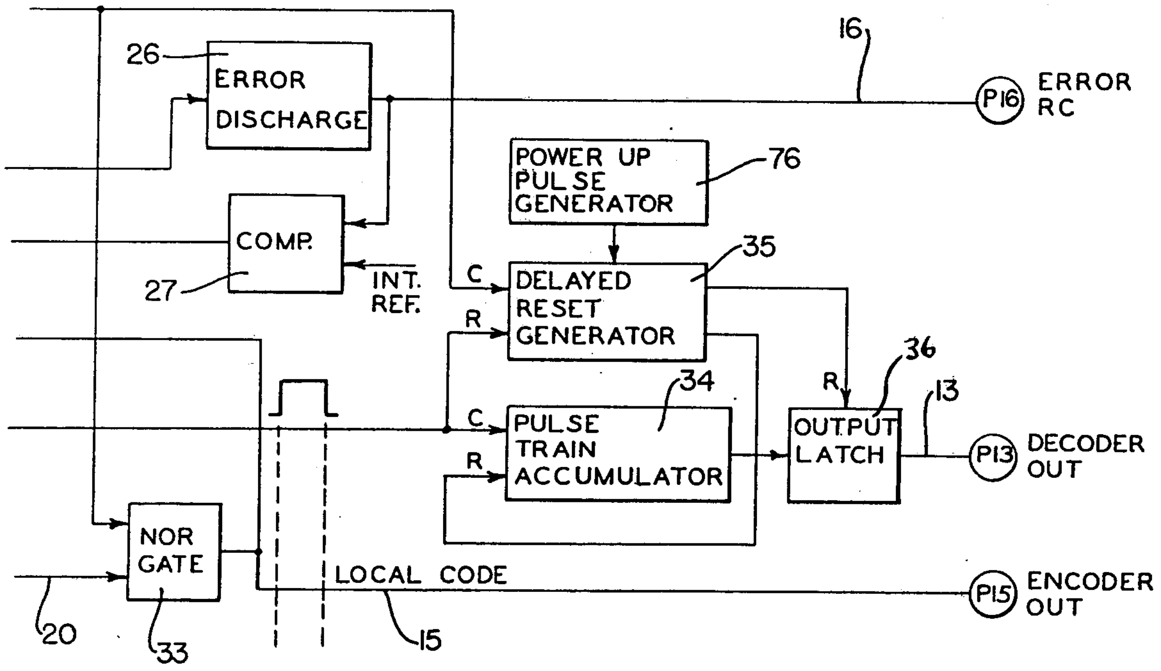

FIG. 4 is a block diagram of the layout of the functional components of the present invention. Oscillator 21 is a free running oscillator having a frequency determined by the external resistor R1 and capacitor C1 connected to pin P17 (see FIG. 2). In the decoder mode, the oscillator 21 is triggered or synchronized on the leading edge of the received input signal coming from the input Schmitt trigger 24. The output of oscillator 21 is coupled to frequency divider 22 which divides the oscillator frequency pulses to develop the desired gating pulses. Similarly, frequency divider 22 is triggered or reset by Schmitt trigger 24 in the decoder mode. The output of frequency divider 22 is fed to the clock gate 23 which provides gating pulses 11 and 12, with gating pulse 11 being high during the first quarter of the clock period determined by divider 22 and pulse 12 being high during the last quarter of the clock period. Clock pulse 11 is coupled to gate 31 whereas pulse 12 is coupled to counter 29, delay reset generator 35, and gate 33.

Figure 5:
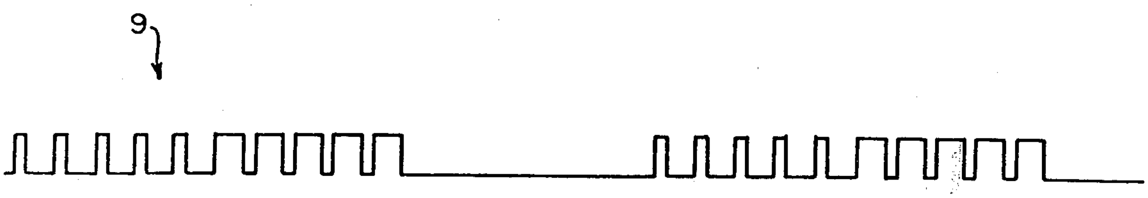
FIG. 5 is a timing chart illustrating the output pulses of the pulse generator of the present invention.

Code select input pins P1–P10 have external voltages applied thereto which set up the particular pulse code. The pins P1–P10 are fed to input amplifier 28 which act as buffers. The output of amplifier 28 is coupled to the input of AND gate 30. AND gate 30 is sequentially gated by counter 29 to individually access one-by-one the outputs of amplifier 28 associated with each code select input. Counter 29, as it counts, provides a series of 16 discrete binary coded output signals, hereinafter referred to as count signals. Consequently, AND gate 30 passes either a high or low signal for the first ten count signals from counter 29 depending upon the code select inputs, and always provides a low signal determining the blank or synchronization times for the remaining 11–16 counts from counter 29. The outputs of gates 31 and 30 are coupled to NOR gate 32 which provides an output pulse of a width depending upon the state of the code select inputs P1–P10. In other words, NOR gate 32 provides ten selective pulses according to the preselected code, followed by a blank synchronization time for six counts during the time counter 29 counts from 11–16. This signal is coupled to NOR gate 33 along with pulses 12 which serve to blank out the last quarter of the clock period. FIG. 5 shows the output from NOR gate 33 when the first five code select switches are not selected and the last five have been selected. Of course, different codes will be provided merely by changing the code select inputs.

In the encoder mode, the output of NOR gate 33, which is referred to as the local code, is coupled to transmitter output pin P15. In the decoder mode, the local code is coupled to one input of a comparison gate 25. The other input to gate 25 is the received code via input pin P14 through Schmitt trigger 24. The leading edge of each received pulse is used to synchronize oscillator 21 and reset frequency divider 23. As in the encoder mode, oscillator 21 runs at a frequency determined by the external resistor capacitor attached to pin P17, but now it is synchronized by the leading edge of the received signal. The local code in the decoder mode is generated in exactly the same manner and utilizes the same components as in the encoder mode. Comparison gate 25 compares the local code and the received code on a pulse-by-pulse comparison basis to determine any pulse width variations. Any differences therein will develop an error pulse at its output. According to a feature of this invention, the error pulse is fed to an error discharge circuit 26 which is fed to pin P16 and connected to an external error time constant resistor R3 and capacitor C3 (see FIG. 2). The value of the external time constant sets the resolution or allowable differences between the local code and the received code. By making the time constant small, the resolution or security of the system is made more secure than other known systems from false or unauthorized signals from being recognized. The output from circuit 26 is then fed to a comparator 27 which compares the amount of error with a reference voltage. When the error voltage exceeds the reference voltage, the comparator 27 resets counter 29. Thus, each time the error between the incoming or received code and the local code is too large, comparator 27 resets counter 29 thus starting the local code generation over again. When ten pulses of the local and received code correspond, the counter will be at count number 10. According to another feature of this invention, a comparison is made of the synchronization times between the received and local codes as well as the pulse width of each. If there is a good comparison of synchronization times, counter 29 will continue to count to count number 16. When it reaches count 14, a signal is fed to accumulator 34 and to delayed reset generator 35. Accumulator 34 will store the number times counter 29 has counted to 14. If there has been a mismatch, accumulator 34 will not receive a count, but will not be reset until four mismatched pulse trains have been detected. If four correct codes have been received before four consecutive mismatched codes are detected, accumulator 34 provides a signal to output latch 36 coupled to pin P13 thereby providing a signal which actuates an external device such as a relay on the motor of the garage door opener. Accordingly, the present invention accommodates for a limited number of mismatched signals which can be expected during use in relatively noisy electrical environments, while at the same time keeping the security of the system intact. On the other hand, if four mismatched signals are detected, generator 35 resets accumulator 34 thereby inhibiting the activation of latch 36. If latch 36 was originally activated due to the receipt by accumulator 34 of the proper number of correctly matched codes, latch 36 will be reset only in the event that reset generator 35 completely times out. In this embodiment, reset generator 35 will time out when a sufficient number of pulses 12 are received to activate its last stage before being reset by a matched signal from counter 29. This will happen when eight mismatches in a row are subsequently detached. When this invention is used in an automatic garage door opener system, this prevents what is known as a "double trip" condition. This occurs when the latch 36 is initially set causing the door, for example, to begin opening. If the operator, while transmitting the code, passes through a "null zone" in which the correct code was not received, latch 36 would be quickly reset but for this provision of the invention. If the latch 36 was reset, when the operator passed out of the "null zone" and the correct code was transmitted again, the latch 36 would be again set thereby causing the garage door to begin closing. However, this "double trip" condition is prevented since this feature of the invention delays resetting or clearing latch 36 only when the reset generator 35 completely times out thereby detecting a greater number of mismatched signals than utilized to clear accumulator 34 alone before it originally provided the output signal to latch 36 for activating it in the first instance. As will be more fully explained herein, reset generator 35 includes a plurality of flip flop stages which are sequentially activated by clock pulses 12. The last stage, if activated, will clear latch 36 whereas the next to last stage will clear accumulator 34. The flip flop stage activation sequence will proceed unless reset by a matched signal from counter 29. Since the clock pulses 12, in this embodiment, are synchronized with the incoming code, the time it takes for the last stage of reset generator 35 to be activated corresponds to eight consecutive mismatched codes, whereas the time to activate the preceding stage corresponds to only four consecutive mismatched codes.

A power up pulse generator 76 generates a pulse whenever power is first applied to the device. This pulse sets generator 35 which in turn resets accumulator 34 and output latch 36 to clear these components when initially used.

Figure 6A:
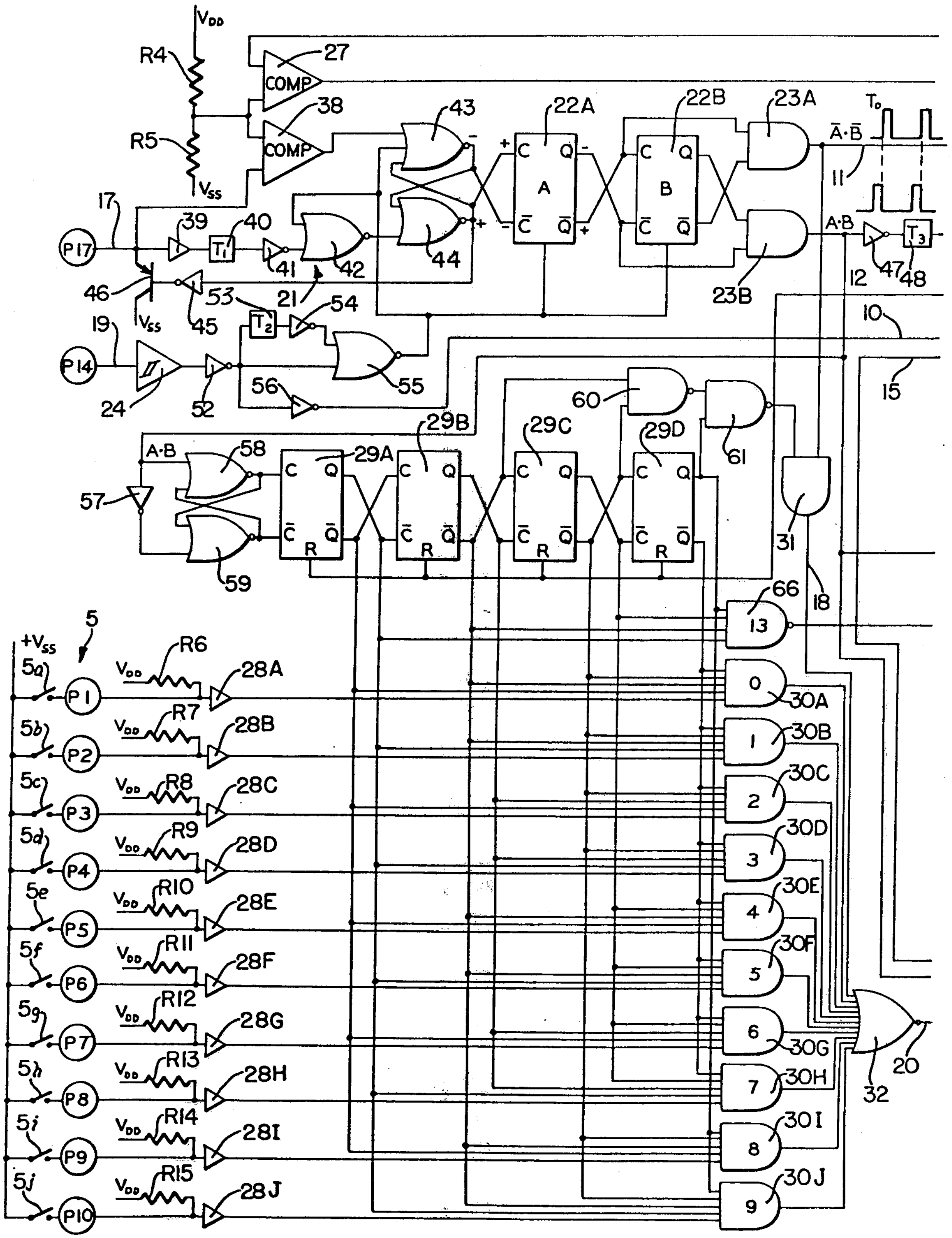
FIGS. 6A and 6B are a schematic diagram illustrating in detail the components shown in block diagram form in FIG. 4.
Figure 6B:
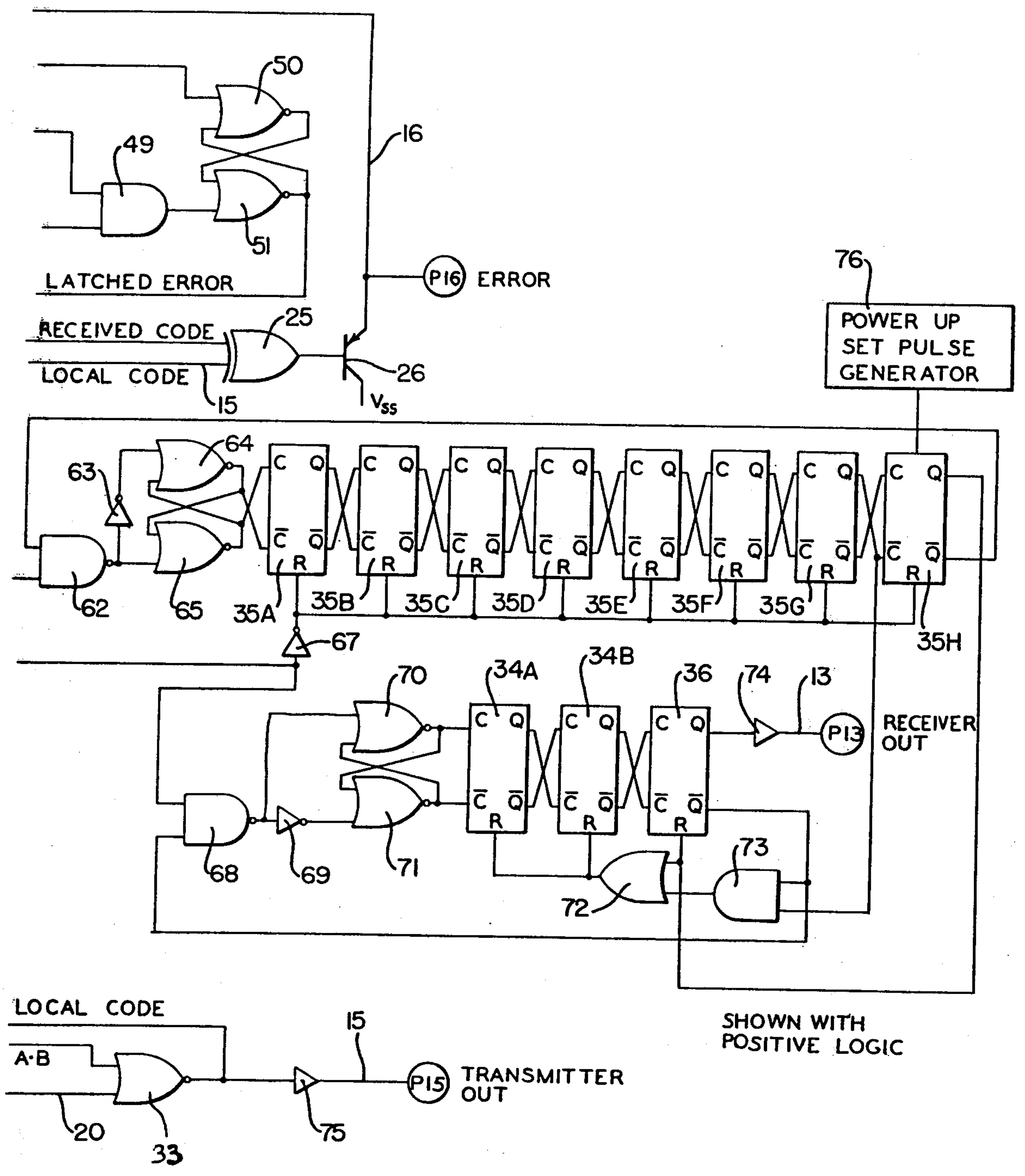

The details of the functional portions of the device previously described are shown in FIG. 6. The device will first be described in connection with use as an encoder and then as a decoder, even though it should now be evident that a majority of the components are utilized in both modes. Again, to aid the reader, the details of the functional blocks will utilize the same reference numerals, but will be followed by a separate letter when appropriate to indicate separate portions of the circuit making up that functional component.

In the encoder mode, oscillator 21 oscillates at the frequency determined by the externally applied resistor R1 and capacitor C1 (see FIG. 2). At time zero or at the first time power is applied, capacitor C1 is discharged and the voltage is applied across the resistor R1. As the capacitor charges, the current through the resistor decreases with the resultant decrease in voltage drop across resistor R1. The voltage at pin C17 is positive and approaches ground as the capacitor C1 charges. The voltage at pin P17 is fed to comparator 38. The other input of comparator 38 is at a fixed reference point and when the voltage of pin P17 drops to that reference voltage, the comparator 38 feeds a high signal to NOR gate 43. NOR gates 43 and 44 comprise an RS (set-reset) storage latch which is self-latching and provides very fast rise and fall times for triggering purposes. When the input to NOR gate 43 goes high, the output goes low and feeds a low signal to the input of NOR gate 44 and to the $\overline{C}$ input of flip-flop 22A. With the input of NOR gate 44 low, the output of NOR gate 44 goes high and its output is fed to the C of flip-flop 22A, switching the outputs thereof to opposite states until the next high clock input returns the outputs back to their original state, thus dividing down the input frequency. The output of NOR gate 44 is also coupled to inverter 45, making the output of inverter 45 low and turning on PNP transistor 46 which discharges the internal capacitor at pin P17 thereby making the voltage at pin 17 high. The high signal at pin 17 is fed to buffer amplifier 39, then to the time delay circuit 40, and to inverter 41. The output of inverter 41 goes low and is fed to NOR gate 42. The second input of NOR gate 42 is low and used only in the decoder mode. With the inputs low to NOR gate 42, the output goes high and is fed to NOR gate 44 thereby returning the output of latches 43 and 44 to their original state. The output of NOR gate 44 then goes low, causing the output of NOR gate 43 to go high. The low signal at the output of NOR gate 44 is fed back to inverter 45 making its output high and turning off transistor 46 thereby permitting capacitor C1 to begin charging again to continually repeat the process to provide a free running oscillator of the determined frequency.

Flip-flops 22A and 22B comprise a divide by four frequency divider. They are triggered on a leading edge or the positive transition of the pulses. Thus, every other clock pulse flips the outputs of flip-flop 22A and 22B to the opposite state, thereby dividing down the oscillator 21 frequency. The reset inputs to flip-flops 22A and 22B are only used in the decoder mode to reset the flip-flops. AND gates 23A and 23B develop the desired clock pulse widths. With suitable gating, many pulse widths, of course, can be chosen. In this embodiment, AND gate 23A develops clock pulse 11, which is the first quarter of the clock period. The clock period is defined from the leading edge to leading edge of the clock pulses and is equal in time to four complete oscillator cycles. AND gate 23B develops pulse signal 12, which is the last quarter of the clock period. Signal 12 is coupled to NOR gate 58 and inverter 57 which, along with NOR gate 59, comprise an RS storage latch. The negative going trailing edge of pulse 12 toggles the latch and clocks flip-flop 29A on the positive going rise time. Flip-flops 29A, 29B, 29C, and 29D make up a four-stage counter which continuously counts to 16 when clocked unless reset to zero by a positive reset pulse. In the encoder mode, the reset is not used and is held at zero by connecting pin P16 to $V_{SS}$ (+). The outputs of flip-flops 29A-29B are coupled to AND gates 30A-30J. Thus, the binary coded outputs of counter 29 fed to AND gate 30 will sequentially step the code select input voltages to NOR gate 32. Pins P1-P10 are the code select inputs and select the selected code for the encoder. The voltage may be applied to the pin inputs P1-P10 by several means, such as switches, jumpers, transistors or gates. In the embodiment shown in FIG. 6, switches 5A-5J are shown coupled to a suitable voltage source $V_{SS}$. If the switches are not closed, resistors R6-R15 will pull the inputs to $V_{DD}$ or ground. The ten select inputs are fed to buffers 28A-28J. The outputs of buffers 28A-28J are fed to AND gates 30A-30J, respectively. Assume that switches 5A-5E are open, then a low signal will be applied to AND gates 30A-30E from buffers 28A-28E. Similarly, assume that switches 5F-5J are closed. Thus, a high signal will be applied to AND gates 30F-30J through buffers 28F-28J. With this selected input code, as flip-flops 28A-29D count, AND gate 30A-30J will sequentially step firstly five low signals and then five high signals to NOR gate 32 at the clock rate.

NOR gate 32 receives the ten selective clock pulses along with signal 18 from AND gate 31. AND gate 31 gates through pulses 11 as long as the output of NAND gate 61 is high. NAND gate 61, along with NAND gate 60 make up a ten clock-period gate for the first ten clock pulses. Therefore, AND gate 31 passes ten first quarter clock pulses 11 for the first ten clock periods and then supplies a low signal for the next six clock periods. The output of NAND gate 31 is also coupled to NOR gate 32 along with the selected clock pulses from gates 30A-30J. Since NOR gate 32 is an inverter, it passes narrow negative first quarter clock pulses when the code switches are open and negative going clock periods when the code switches are closed. After the ten pulses are provided corresponding to the selected code, a positive blank sync time for six clock periods is produced. This signal 20 from NOR gate 32 is coupled to one input of NOR gate 33. The other input of NOR gate 33 is coupled to pulses 12, which is used to blank out the last quarter of the negative going clock periods from NOR gate 32, thereby providing the local code emanating from NOR gate 33. As shown in FIG. 5, after ten select code pulses, there is a blank sync period of six clock periods used in the decoder to synchronize the received and local codes as well as trigger the decoder outputs. In the encoder mode, the local code 15 is coupled to pin P15 through buffer 75 to be transmitted to the receiver portion.

In the decoder mode, the same components are utilized to generate the local code against which the received code is compared as was utilized in the encoder mode to provide the transmitted signal. The oscillator 21 oscillates at a frequency depending upon external resistor R2 and capacitor C2. The values of resistor R2 and C2 are chosen to be similar to R1 and C1 so that the oscillators run close to the same frequency as the encoder. The oscillator 21 thus operates in the same manner as previously described. The oscillator 21 freely oscillates unless it receives a sync pulse which comes from the received code at pin 14. Pin 14, the decoder input, receives the incoming pulse train and feeds it through Schmitt trigger 24. Schmitt trigger 24 squares up the rise and fall times of the incoming waveform, and feeds it to inverter 52. The inverted signal is then fed to time delay 53 and inverter 56. The output of inverter 56 is the received pulse code pin which is coupled to exclusive OR gate 25 for comparison with the local developed code. When the output of inverter 52 goes low, which is the leading edge of each pulse, both inputs of NOR gate 55 are low thereby causing the output of NOR gate 55 to go high. The output is fed to NOR gate 43 to reset oscillator 21 and flip-flops 22A-22B to reinitiate the clock. The outputs of NOR gate 55 remain high only to generate a narrow positive pulse. Time delay 53, inverter 54, and NOR gate 55 comprise a one shot multi-vibrator. When the low at the output of inverter 52 is fed to the input of NOR gate 55 and time delay 53, both inputs of NOR gate 55 are low. However, when the time delay has elapsed, inverter 54 inverts the low at its output to a high signal, thereby causing the output of NOR gate 55 to become low again, thereby generating the narrow positive sync pulse at the leading edge of each received pulse for synchronizing the oscillator 21 and resetting the dividers 22A and 22B.

Flip-flops 22A and 22B thus reset by the incoming pulse code, provide the oscillator frequency and feed the AND gates 23A and 23B to develop the local clock signals 11 and 12. The output 12 from AND gate 23B is coupled through the latch comprised of inverter 57, and gates 58, 59 to clock the counter flip-flops 29A-29D. The local code for the decoder is then generated in exactly the same manner as the encoder, using the same components. Counter 29 will sequentially count first to ten, thereby transferring the local code data from switches 5A-5J to the output of NOR gate 33, and then continue to count to 16 before it repeats unless it receives a reset pulse that starts the counting process over again. The local code in the decoder mode is fed to exclusive OR gate 25. Gate 25 compares the local code 15 to the received code pulse 10 on a pulse-by-pulse comparison basis. If the pulses continuously match, the output of exclusive OR gate 25 will remain low, keeping PNP transistor 26 turned on and the error pin 16 in the high state. However, when any pulse or part of a pulse does not exactly coincide, the output of gate 25 will go high, turning off transistor 26. Externally connected capacitor C3 to pin 16 as well as resistor R3 will determine the time constant as to how fast the capacitor will charge. The charge time constant determines how much resolution or allowable error the two compared signals can have before a reset pulse is generated. As long as transistor 16 is on, pin 16 is held high, keeping the external capacitor discharged. The instant an error is detected, transistor 26 turns off and the voltage $V_{SS}$ is applied across the external resistor R3 keeping pin 16 high. As the capacitor C3 charges, the current through the resistor R3 drops and, accordingly, so does the voltage across the resistor R3. The voltage at pin 16 is coupled to comparator 27 and is compared with a reference voltage developed by resistors R4 and R5. When the voltage at pin 16 drops to the reference level, after an error has occurred, the comparator output goes high, thereby flipping error latch comprised of gates 50-51. With a high applied to NOR gate 50, its output goes low and is fed to NOR gate 51. The other input of NOR gate 51 is normally low and is controlled by the clock through AND gate 49. With both inputs of NOR gate 51 low, its output will go high feeding back a high signal to NOR gate 50 thereby locking up the error latch. The high signal at the output of NOR gate 51 is also coupled to the reset input of counter flip-flops 29A–29D. Accordingly, the counter 29 ceases its counting process upon receipt of a signal from the error detection circuitry signifying a mismatch beyond a tolerated level between a pulse of the received code and a corresponding pulse of the local code. The amount of tolerance permitted is adjustable by changing the values of resistor R3 and/or capacitor C3 determining the time constant. For example, this can be accomplished by making resistor R3 a variable resistor which can be manually adjustable as shown in FIG. 2. Counter 29 remains reset until NOR gate 51 is unlatched by a signal from AND gate 49. The inputs of AND gate 49 are coupled to waveforms 11 and 12. The output of AND gate 49 thus will go positive on the leading edge of the output time delay 48 which will occur slightly after clock pulse has reached counter flip-flops 29A–29D. This reset delay presents the counter 29 from clocking until the second clock pulse occurs and at that time the counter 29 also steps to the second decode select position.

Counter flip-flops 29A–29D continue to step through or count as long as there is no detectable error. In this embodiment, the sync time as well as the pulses of the received and local codes are compared. If this comparison corresponds such that counter 29 reaches count 14, the output of NAND gate 66 goes low. The output of NAND gate 66 is coupled through inverter 67 thereby resetting the delayed reset generator flip-flops 35A–35H. The "14" count signal from counter 29 is also fed to NAND gate 68. The other input of NAND gate 68 is high until the pulse train accumulator flip-flops 34A and 34B cause the output latch 36 flip-flop to flip and block any more of the "14" pulses. At the end of the "14" pulse, the output of NAND gate 68 goes low from the leading edge of the "15" clock pulse. The output of NAND gate 68 is fed through inverter 69 to NOR gate 71 and NOR gate 70. The high signal at the input of NOR gate 71 flips the output low, which is sent to NOR gate 70. Both inputs of NOR gate 70 become low, thereby causing the output to go high thereby clocking pulse train accumulator flip-flops 34A and 34B. After four complete proper pulse trains with blank sync time, the pulse train accumulator 34A and 34B will then clock the output latch 36 giving a high signal at its output through buffer 74 to output pin 13. The output latch 36 feeds back a low signal to NAND gate 68 blocking any more "14" clock pulses to the pulse train accumulator 34. The pulse train accumulator 34 and output latch 36 are reset by the delayed reset generator flip-flops 35A–35H.

The delayed reset generator 35 requires a total of 128 clock pulses or a total of eight pulse trains with errors to trigger the Q output of flip-flop 35H to go high and the $\overline{Q}$ output to go low, thereby blocking the clock input to NAND gate 62. Normally the $\overline{Q}$ output of flip-flop 35H is high because of the "fourteen" pulses on NAND gate 66 through inverter 67 which resets the delayed reset generator flip-flops 35A–35H after every good pulse train. This reset signal puts all of the $\overline{Q}$ flip-flop outputs high and starts the reset 35 over. The output of $\overline{Q}$ flip-flop 35H is fed back to the one input of NAND gate 62 allowing the clock pulse 12 to trip latch 64 and 65 along with the inverter 63. When both inputs of NAND gate 62 go high, the output thereof goes low and is fed to NOR gate 65 and inverter 63. The output of inverter 63 thus goes high which flips NOR gate 64 causing its output to go low. Accordingly, both of the inputs of NOR gate 65 are low causing its output to go high and to clock flip-flop 35A. Each clock pulse will step the delayed reset generator 35 unless it is reset by a good pulse train represented by the "fourteen" count signal. There are two reset lines from the delayed reset generator 35. One is used to reset only the pulse train accumulator 34, with the other to reset both the accumulator 34 and output latch 36.

When data is transferred from one point to another, be it by a pair of wires or by air through an RF transmitter, some or all of the information can be lost or changed. Accordingly, the receiver may detect a mismatch between the received code and the transmitted code even though the originally transmitted code did match the internally generated local code in the receiver. According to another feature of this invention, provision is made for tolerating a limited number of mismatched codes which may be due to interference and not due to an incorrectly transmitted code. The delayed reset generator 35 counts the number of clock pulses between good pulse trains. If the delayed reset generator 35 reaches 64 counts, equivalent to four pulse trains, before latch 36 is activated, it feeds a high signal through AND gate 73 and OR gate 72 to reset the pulse train accumulator flip-flops 34A and 34B. However, accumulator 34 is designed so that it can count properly matched pulse trains before four mismatched pulse trains are detected in which case accumulator 34 is reset and must start the process over again. If accumulator 34 does reach four good pulse trains and trips output latch 36, the output of latch 36 goes high and the $\overline{Q}$ output goes low feeding a low signal to NAND gate 73 thus blocking the reset signal from the $\overline{Q}$ output of flip-flop 35G. In order to reset the output latch 36 and accumulator 34, it takes 128 clock pulses in a row from generator 35 which is equivalent to 8 incorrect pulse trains. In other words, once the output latch 36 has been activated to actuate the output load, it takes 8 incorrect pulse trains to reset both the latch 36 and accumulator 34. This is in comparison to only four mismatch pulse trains to reset only accumulator 34 before it is set. After receiving 128 clock pulses without a good pulse train to reset generator 35, the $\overline{Q}$ output of flip-flop 35H will go high and reset output latch 36, as well as accumulator 34 through OR gate 72.

When power is initially applied to the system, flip-flop 38H is set by power up set pulse generator 76, thereby making the $\overline{Q}$ output high to reset the output latch 36 and the pulse train accumulator 34 so that the output at pin 13 is not high when power is first applied.

Figure 7:
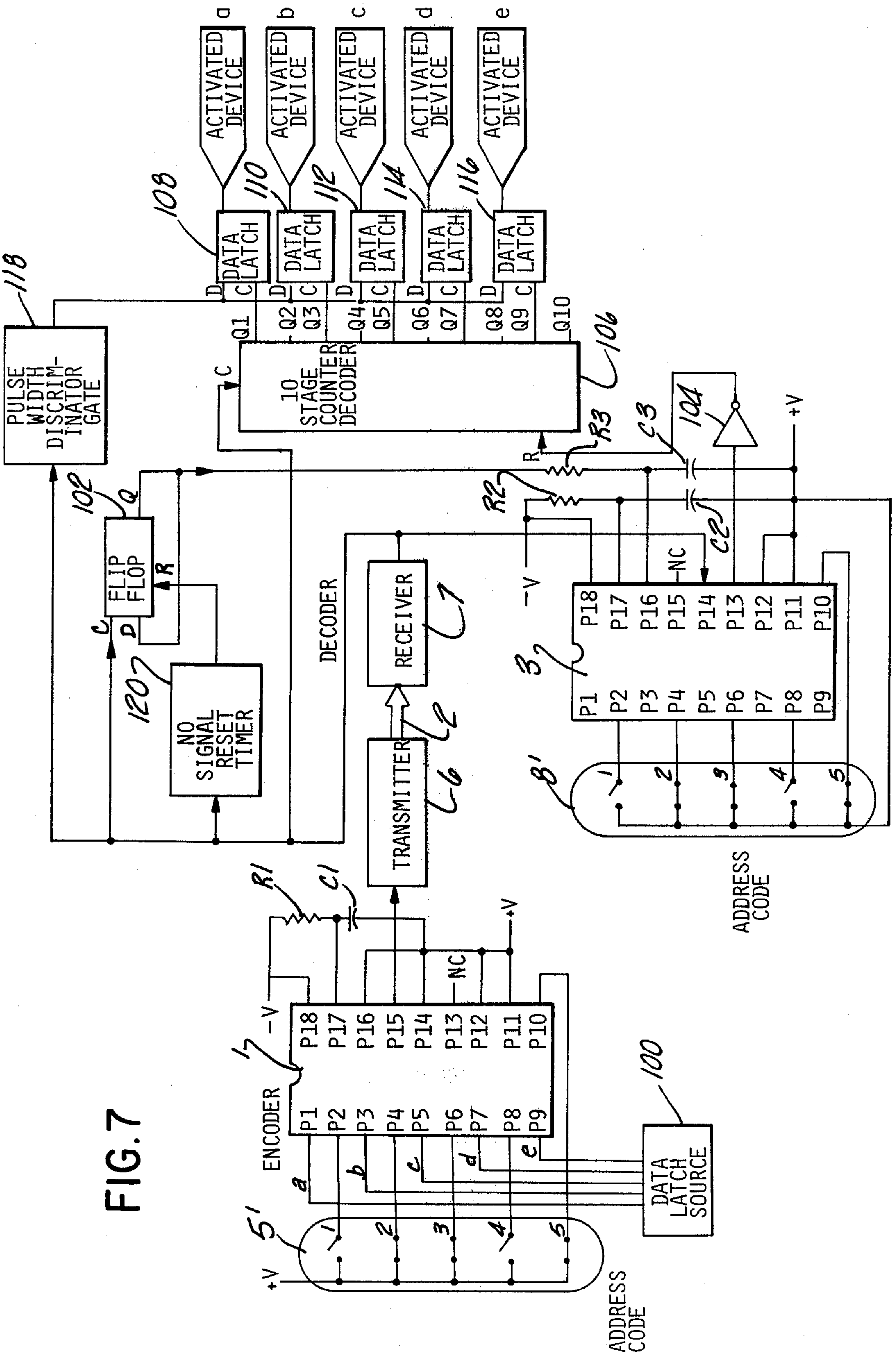
FIG. 7 is a schematic diagram of a data communication system utilizing the encoder/decoder device according to an alternative embodiment of the invention.

FIG. 7 shows a modified version of the system previously described which finds particular utility as a line carrier communication technique for a home security system such as that disclosed in concurrently filed U.S. patent application Ser. No. 140,045, entitled "Home Security And Garage Door Operator System," by Duhame.

Comparing FIG. 7 with FIG. 2, it can be seen that encoder 1 includes two sets of inputs in the alternative embodiment. The first set of inputs include five two position code select switches 5′ which are coupled to the even numbered encoder input pins P2, P4, P6, P8, and P10. The other set of encoder inputs is derived from a data input source 100. The output lines a–e from data source 100 are coupled to the odd numbered encoder input pins P1, P3, P5, P7, and P9. Data source 100 will either supply a logical one high level or logical zero low level on output lines a–e. Accordingly, a high level on one of the input lines to encoder 1 will simulate a closed position of a code select switch which was previously used in the embodiment shown in FIGS. 1–6. The data on lines a–e may represent a wide variety of information. In the preferred embodiment, the signal content on lines a–e will be used to control the energization of a plurality of remote loads. With reference to the above-identified patent application to Duhame, data line a may represent the position of a garage door; data line b may provide an indication of whether a burglar alarm is set; line c providing an indication of whether a burglar alarm has been activated; line d providing an indication of whether a toxic gas sensor has been activated; and line e providing an indication of whether a heat sensor has been activated.

Figure 8:
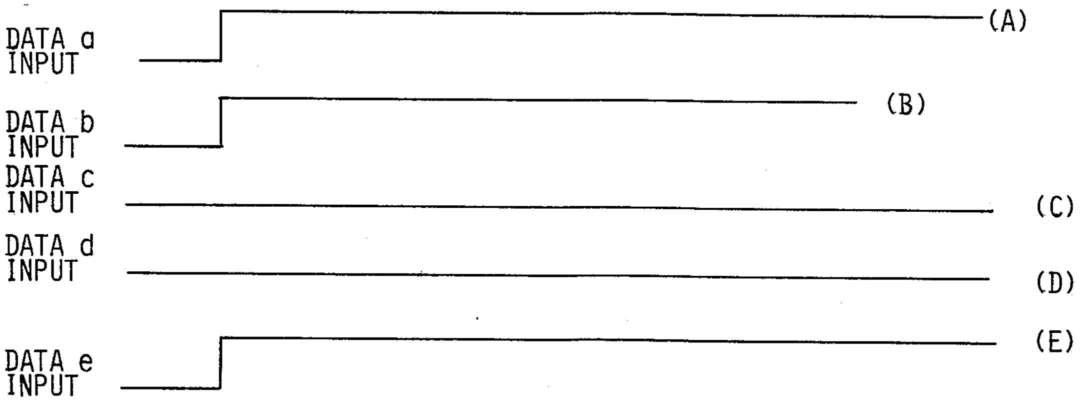
FIG. 8 shows examples of wave forms utilized as inputs to the encoder.

FIG. 8 shows an example of the signal levels on data lines a–e with lines a, b, and e being at a logical high level and data input lines c and d being at a logical zero level. With the data input lines a–e at the levels shown in FIG, 8 and the code select switches 5′ in the positions shown in FIG. 7, encoder 1 will provide an output pulse train such as that shown in FIG. 9A. Thus, it can be seen that the even numbered pulses define an address code associated with the position of code select switches 5′ whereas the odd numbered pulses define data associated with the signal levels on lines a–e from data source 100. Note that a high level on an encoder input will provide a wider output pulse than the pulses generated when no voltage is supplied to the encoder input. For purposes of this invention the states of the bits are defined by their relative widths.

Transmitter 6, in this particular embodiment, amplitude modulates the pulse train from encoder 1 and transmits the signal over data link 2 to receiver 7. In this preferred embodiment, data link 2 is provided by normal 110 volt house wiring.

Figure 9:
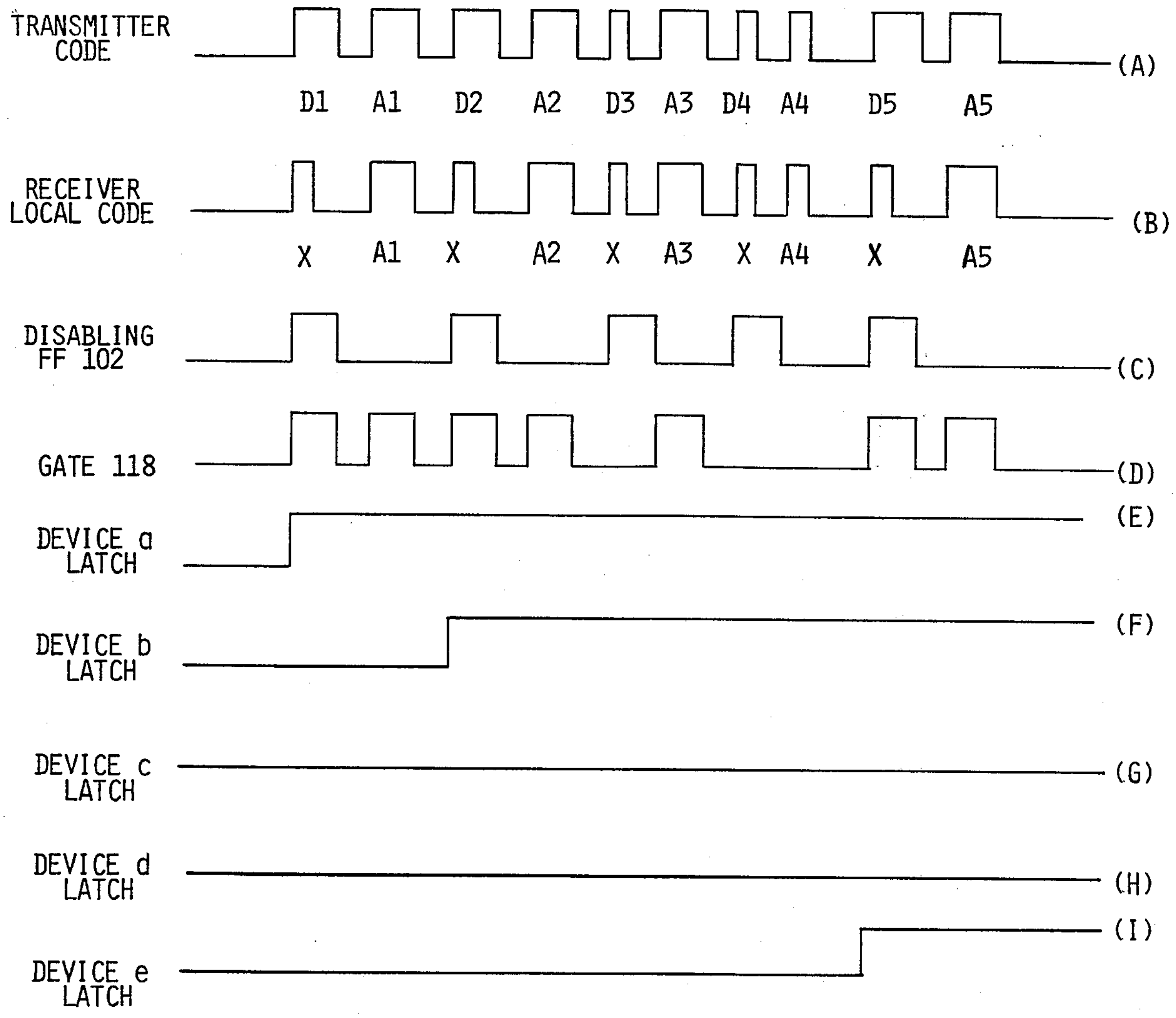
FIG. 9 is a timing chart illustrating the timing sequence of various components of the system shown in FIG. 7.

Decoder 3 employs five two position switches 8′ which are coupled to the even numbered decoder inputs P2, P4, P6, P8, and P10. In contrast with the embodiment shown in connection with FIGS. 1-6, the odd numbered inputs to decoder 3 are not connected. Thus, the local pulse train generated by decoder 3 will be that such as shown in FIG. 9B. Note that the odd numbered pulses in the local pulse train are all of a relatively narrow width due to the fact that no connection is made to the odd numbered decoder inputs. However, the widths of the even numbered pulses will depend upon the position of the code select switches 8′.

As fully explained above, decoder 3 makes a pulse by pulse comparison of the received pulse train from transmitter 6 with a locally generated pulse train. In the embodiment shown in FIG. 1-6, it is clear that there would be no receiver output signal on pin P13 indicating a match since the state of the odd numbered pulses in the pulse trains shown in FIG. 9A and 9B do not all coincide. However, pursuant to one aspect of this alternative embodiment there is provided means for selectively disabling the pulse by pulse comparison of the bits in the received pulse train defining data with corresponding bit locations in the local pulse train. This is accomplished by the provision of flip-flop 102. The clock input to flip-flop 102 is coupled for receipt of each of the transmitted incoming pulses. The Q output of flip-flop 102 is coupled to the error pin P16 of decoder 3. Each incoming pulse will toggle flip-flop 102 such that the Q output line to error pin P16 will alternately provide high and low signals to error pin P16 as shown in FIG. 9C. It will be remembered by referring again to FIG. 6 that the signal level on pin P16 will determine whether comparator 27 will reset counter 29. Ordinarily, if exclusive OR gate 25 compared the first pulse of the transmitted code (FIG. 9A) with the corresponding bit in the local code (FIG. 9B), the voltage level on pin P16 would fall below the reference level of comparator 27 thereby resetting counter 29 and preventing a match signal from being generated on pin P13. However, the high level on flip-flop line 102 in the alternative embodiment of FIG. 7 will prevent comparator 27 from being energized even though there are differences between the states of the odd numbered pulses in the received and local pulse train. In contrast, upon receipt of each even numbered pulse, the Q output line of flip-flop 102 will be at a low level thereby enabling the normal comparison circuitry operation noted before. Accordingly, if all of the even numbered address pulses coincide in width, decoder 3 will provide an output signal on pin P13 indicating a match. As noted before, this will occur after four consecutive pulse trains with the correct address codes are received.

The high level on the receiver output pin P13 is inverted by inverter 104 whose output is coupled to the reset input of a known ten stage counter/decoder 106. This removes a high level from the reset input of counter 106 thereby enabling its outputs Q1–Q10. Counter 106 may be of any commercially available type in which its output stages are sequentially energized upon receipt of each clock pulse. For example, stage one and its associated output line Q1 will go high on the first clock pulse, stage two on one second clock pulse, stage three on the third clock pulse, etc.

Each data pulse in the subsequently received pulse train is utilized to selectively activate data latches 108–116. This is accomplished by the cooperation of counter 106 along with a pulse width discriminator gate 118. Gate 118 is operative to provide a high output signal whenever a pulse width at its input exceeds a predetermined width. Pulse width discriminator circuitry is well known in the art. As can be seen in FIG. 9D, pulse width discriminator gate 118 provides a high output signal for bits D1, A1, D2, A2, A3, D5, and A5 in the received code from the transmitter. With respect to the first bit D1 in the pulse train representing data, it will simultaneously activate stage one of counter 106 and gate 118. Therefore, data latch 108 will be set (FIG. 9E) to thereby activate its associated device a. The second bit in the pulse train will enable gate 118 and the second stage of counter 106. However, output line Q2 which is associated with the second stage of counter 106 is not connected to any data latch. Therefore, no load is affected. However, the third stage output line Q3 of counter 106 is coupled to data latch 110 which will be activated by the third pulse D2 (FIG. 9F). Data latches 112 and 114 will not be set (FIGS. 9G and 9H) because the pulse widths of data bits D3 and D4 will not activate gate 118. However, the ninth pulse D5 in the received code will activate gate 118 along the ninth stage of counter 106 to set data latch 116 (See FIG. 9I).

Thus, it can be seen that the high data input levels on lines a, b, and e to encoder 1 serve to activate devices a, b, and e associated with data latches 108, 110, and 116 at a remote location. In the embodiment shown in FIG. 7, there are 32 possible address codes ($2^5$) and five data pulses which are used to selectively control five loads. However, the system can be expanded to selectively activate up to 32 possible loads by using the states of data latches 108–116 as a binary code thereby providing $2^5$ remote load activating signals.

A timer 120 resets flip-flop 102 after a predetermined time period has elapsed in which no further pulses are received. Timer 120 can be of conventional design and may employ a digital timer or conventional resistor-capacitor networks.

Thus, it can be seen that the advantages of the encoder/decoder chip may be used, with relatively little additional circuitry, to receive multiple data signals for activating a plurality of remote loads and still have the security of an address which must be correct before the data can be utilized to activate any of the remote loads.

It should be understood that the preceding description sets out the preferred embodiments of the present invention according to the mandates of the patent statutes. However, many modifications of the unique concepts disclosed herein should become apparent to one skilled in the art after reading the peceding description. Therefore, while this invention has been described in connection with particular examples thereof, no limitation is intended thereby except as defined by the appended claims.

We claim:

1. A data communication system for remotely activating a plurality of loads, said system comprising:

transmitter means having an encoder with first and second sets of inputs, operative to provide a multi-bit pulse train for transmission to a receiver, selected bits of said pulse train being associated with the first set of encoder inputs and defining an address code, with other bits of the pulse train being associated with said second set of encoder inputs and defining data;

receiver means having a decoder coupled for receipt of the pulse train from the transmitter, a set of code select inputs for the decoder defining a local address code for the receiver, generator means for providing a local pulse train as a function of the code select inputs, comparison means having inputs coupled for receipt of the local pulse train and the transmitted pulse train for making a sequential pulse-by-pulse comparison therebetween, disabling means having an input coupled for receipt of the transmitted pulse train and an output coupled to said comparison means, operative for selectively disabling the comparison means from comparing the data bits in the transmitted pulse train with corresponding bit positions in the local pulse train; and activator means for energizing selected loads according to the states of the data bits in the transmitted pulse train if the address code portions of the local and transmitted pulse train match.

2. The system of claim 1 wherein the first set of encoder inputs comprises a plurality of manually operable switches to permit the user to define the address code.

3. The system of claim 2 wherein said second set of encoder inputs provide control signals for activating particular loads.

4. The system of claim 3 wherein said encoder alternately generates data bits and address bits for the transmitted pulse train, and wherein said decoder generates said address code portion in bit positions corresponding with the address code bit positions in the transmitted pulse train.

5. The system of claim 4 wherein said disabling means comprises bistable means having an input coupled for receipt of the transmitted pulse train and an output coupled to said comparison means, operative to alternately provide a given state on said output to alternately disable said comparison means upon receipt of each pulse of the transmitted pulse train.

6. The system of claim 5 wherein the states of the bits in the transmitted pulse train and local pulse train are determined by different pulse widths.

7. The system of claim 6 which further comprises:

counter means having a clock input, a reset input, and a plurality of output stages;

means for coupling the transmitted pulse train to the clock input of said counter, operative to sequentially energize an output stage of said counter;

pulse width discriminator means having an input coupled for receipt of said transmitted pulse train, operative to provide an output signal whenever a bit in the pulse train exceeds a predetermined width; and a plurality of latch means having at least two inputs, operative to provide an output signal for activating a selected load upon receipt of enabling signal at both of its inputs, one input of each latch being coupled to the output of said pulse width discriminator means, and the other input of said latches being connected to selected stages of said counter whereby said latches are selectively enabled by a wide pulse occuring at selected bit positions within the transmitted pulse train.

8. The system of claim 7 wherein said one inputs of each of said data latches are coupled to alternative output stages of said counter whereby to coincide with the data bit positions in the transmitted pulse train.

9. The system of claim 8 wherein said decoder means provides an enabling signal to the reset input of said counter when the address code portions of the transmitted and local pulse trains match.

10. The system of claim 9 which further comprises:

timer means for resetting said bistable means when no further transmitted pulses are received within a given time period.

11. A line carrier system for selectively activating a plurality of remote loads in a building as a function of selected detector devices located in a different part of the building, said system comprising:

a first group of manually operable switches defining an address code;

an encoder with first and second sets of inputs, operative to provide a series of multi-bit pulse trains for transmission to a receiver in which the states of each bit are defined by their relative pulse widths, odd numbered bits in the pulse train being associated with said detector devices and defining data for controlling the actuation of selected ones of the remote loads, even numbered bits in the pulse train being associated with the first group of switches and defining an address code;

means for transmitting said pulse trains over wiring in the building to a receiver at a remote location;

a second group of manually operable switches defining a local address code for the receiver;

an encoder having a generator means for providing a local multi-bit pulse train in which the width of each bit is a function of the second group of switches; comparison means having inputs coupled for receipt of the local pulse train and the transmitted pulse train, operative for making a comparison of the pulse widths of corresponding bits in the local and transmitted pulse trains on a sequential pulse-by-pulse basis and generating a match signal if all compared pulses have substantially the same widths;

bistable means having an input coupled for receipt of the transmitted pulse trains and an output coupled to said comparison means, operative to provide disabling signals to the comparison means for each odd numbered bit in the transmitted pulse train whereby said comparison means will only compare the even numbered pulses associated with the address codes and will generate said match signal as long as the pulse widths thereof are substantially the same even though there may be differences between the odd numbered bits representing data;

a plurality of latches, one each connected to a selected one of said remote loads;

pulse width discriminator means coupled for receipt of said transmitted pulse trains, operative to provide an output signal whenever a bit in the pulse train exceeds a predetermined width; and enabling means for enabling selected ones of said latches as a function of the output signal from the discriminator means and the match signal from the encoder.

12. The system of claim 11 wherein said enabling means comprises:

a multi-stage counter having a reset input coupled for receipt of said match signal, a count input coupled for receipt of the transmitted pulse trains, and a plurality of outputs in which the odd numbered outputs are coupled to said latches;

the outpt signal from the discriminator means being coupled to other inputs of said latches whereby a match signal enables said counter which sequentially activates each output for each subsequently received pulse of the transmitted pulse train and cooperates with the output signal from the discriminator to selectively enable each latch when its corresponding odd numbered data bit in the transmitted pulse train exceeds a predetermined width.

* * * * *